(12) United States Patent
Rossebø et al.

(10) Patent No.: US 10,362,500 B2
(45) Date of Patent: Jul. 23, 2019

(54) DETECTING THE STATUS OF A MESH NODE IN A WIRELESS MESH NETWORK

(71) Applicant: ABB Schweiz AG, Baden (CH)

(72) Inventors: Judith Rossebø, Oslo (NO); Amalavoyal Chari, Menlo Park, CA (US); Apala Ray, Bankura (IN); Mohammad Chowdhury, Oslo (NO)

(73) Assignee: ABB Schweiz Ag, Baden (CH)

( * ) Notice: Subject to any disclaimer, the term of this patent is extended or adjusted under 35 U.S.C. 154(b) by 102 days.

(21) Appl. No.: 15/510,864

(22) PCT Filed: Sep. 12, 2014

(86) PCT No.: PCT/EP2014/069477
§ 371 (c)(1),
(2) Date: Mar. 13, 2017

(87) PCT Pub. No.: WO2016/037657
PCT Pub. Date: Mar. 17, 2016

(65) Prior Publication Data
US 2017/0251387 A1 Aug. 31, 2017

(51) Int. Cl.
*H04W 24/06* (2009.01)
*H04L 12/26* (2006.01)
(Continued)

(52) U.S. Cl.
CPC ........... *H04W 24/06* (2013.01); *H04L 41/069* (2013.01); *H04L 41/142* (2013.01); *H04L 41/30* (2013.01);
(Continued)

(58) Field of Classification Search
CPC .... H04W 24/06; H04L 63/1425; H04L 43/10; H04L 41/142
See application file for complete search history.

(56) References Cited

U.S. PATENT DOCUMENTS 7,805,518 B1 * 9/2010 Kamvar ................ H04L 63/126
709/227
9,843,596 B1 * 12/2017 Averbuch ............ H04L 63/1416
(Continued)

FOREIGN PATENT DOCUMENTS

IN 2142/CHE/2008 11/2008
WO 2014011191 A1 1/2014

OTHER PUBLICATIONS

A hierarchical architecture for detecting selfish behaviour in community wireless mesh networks; by Nikhil Saxena, Mieso Denko 1, Dilip Banerji; Department of Computing and Information Science, University of Guelph, Guelph, Ontario, Canada N1G 2W1; Article history: Available online May 5, 2010 (Year: 2010).*
(Continued)

*Primary Examiner* — Hassan Kizou
*Assistant Examiner* — Deepa Belur
(74) *Attorney, Agent, or Firm* — Taft Stettinius & Hollister LLP; J. Bruce Schelkopf

(57) ABSTRACT

A method for detecting the status of a mesh node in a wireless mesh network, wherein a gateway is building up a vector over time by combining active detection, passive detection and binary tests on anomaly metrics and wherein the status of the mesh node is regarded as misbehaving when the vector reaches a certain level.

7 Claims, 5 Drawing Sheets

(51) Int. Cl.
H04W 84/18 (2009.01)
H04L 12/24 (2006.01)
H04L 29/06 (2006.01)

(52) U.S. Cl.
CPC .......... *H04L 43/04* (2013.01); *H04L 43/0817* (2013.01); *H04L 43/10* (2013.01); *H04L 43/16* (2013.01); *H04L 63/1425* (2013.01); *H04W 84/18* (2013.01)

(56) References Cited

U.S. PATENT DOCUMENTS

| | | | |
|---|---|---|---|
| 2007/0297349 A1* | 12/2007 | Arkin ...................... | H04L 12/66 370/255 |
| 2009/0096686 A1 | 4/2009 | Niculescu et al. | |
| 2009/0328148 A1 | 12/2009 | Lee et al. | |
| 2011/0078775 A1 | 3/2011 | Yon | |
| 2012/0072983 A1* | 3/2012 | McCusker ............ | H04L 63/126 726/22 |
| 2013/0094398 A1 | 4/2013 | Das et al. | |
| 2013/0298243 A1* | 11/2013 | Kumar .................... | G06F 21/52 726/25 |
| 2013/0315077 A1 | 11/2013 | Toshiaki et al. | |
| 2014/0105058 A1 | 4/2014 | Hu et al. | |
| 2015/0135277 A1* | 5/2015 | Vij ...................... | H04L 63/0892 726/4 |
| 2017/0006417 A1* | 1/2017 | Canoy .................. | H04L 63/126 |
| 2017/0339178 A1* | 11/2017 | Mahaffey .............. | H04L 41/142 |

OTHER PUBLICATIONS

An Effective Attack Detection Approach in Wireless Mesh Networks; 2013 27th International Conference on Advanced Information Networking and Applications Workshops; Felipe Barbosa Abreu et all. (Year: 2013).*

Monitoring for Intrusion Detection in Mobile Ad Hoc Networks Rajendra V. Boppana, Senior Member, IEEE, and Xu Su, Member, IEEE; IEEE Transactions on Mobile Computing, vol. 10, No. 8, Aug. 2011 (Year: 2011).*

Algorithms and Protocols for Wireless and Mobile Ad Hoc Networks; Wiley Series on Parallel and Distributed Computing; Edited by Azzedine Boukerche, PhD University of Ottawa Ottawa, Canada (Year: 2009).*

European Patent Office, International Search Report and Written Opinion, PCT/EP2014/069477, dated Jun. 18, 2015, 11 pages.

Saxena et al., "A hierarchical architecture for detecting selfish behaviour in community wireless mesh networks", Computer Communications, vol. 34, Issue 4, May 5, 2010, pp. 548-555.

Baccour et al. "Radio Link Quality Estimation in Wireless Sensor Networks: a Survey", ACM Transactions on Sensor Networks (TOSN) (Sep. 1, 2012): 35 pages, vol. 8, No. 4, Article 34.

Kim et al., "On accurate and asymmetry-aware measurement of link quality in wireless mesh networks", IEEE/ACM Transactions on Networking (TON), pp. 1172-1185 (14 pages), vol. 17, Issue 4, Aug. 2009.

J. Rossebø et al., "Towards a Framework for Evaluating Risk When Customer Premises Networks are Integrated in the Smart Grid," Proceedings of International Workshop on Risk and Trust in Extended Enterprises (RTEE'2010), dated Nov. 2010, 8 pages.

I. Ray et al., "VTrust: A Trust Management System Based on a Vector Model of Trust," Proceedings of the 1st International Conference on Information Systems Security, dated Dec. 2005, 14 pages.

I. Ray et al., "An Interoperable Context Sensitive Model of Trust," Journal of Intelligent Information Systems, dated 2009, 37 pages, vol. 32, No. 1.

* cited by examiner

DETECTING THE STATUS OF A MESH NODE IN A WIRELESS MESH NETWORK

TECHNICAL FIELD

The present invention relates to the technical field of wireless network communication. In particular, it concerns a method for detecting the status of a mesh node in a wireless mesh network.

BACKGROUND

Tropos Metro Mesh is a system of nodes used in Tropos wireless networks for mission critical applications. The Tropos Metro Mesh routers have a set of security countermeasures employed so that when a node communicates with another node it can already ascertain whether the node is trusted or not. The Mesh routing protocol is designed for selecting optimal and best alternate paths for high throughput and low latency. While it is designed to react and respond quickly to disruptions and failures, it is not designed to detect misbehaving nodes.

In the dynamic environment of the Tropos mesh network (and similarly for other wireless mesh networks) where an increasing number of nodes are integrated and with a range of types of end users (Wi-Fi clients) using different types of services over the Tropos mesh network, there is also a need to establish trust that such mechanisms are working while allowing for the possibility to increase the resilience of the network to attacks.

Availability attacks and attacks on wireless mesh nodes are in general difficult to protect against as they are dynamic and may involve a coordinated and distributed effort to carry out. While wireless mesh networks implement security standards and a layered approach to security, the devices often operate in the public domain (unlicensed spectrum) giving threat agents the opportunities to find ways of bypassing security.

Existing mechanisms such as Intrusion Detection Systems (IDS) and Honeypots have a well-known problem of false positives, meaning a tendency to generate too many alarms, and making it hard to separate intended from malicious activity. There is a need for minimising the amount of false positives while building a good understanding of the behaviour of an anomalous node so that it is possible to more accurately detect whether a node is misbehaving.

The invention makes use of a reputation scheme based on previous work in J. E. Y. Rossebø, K. Hansen, K. McGrath and S. H. Houmb, "Towards a Framework for Evaluating Risk When Customer Premises Networks are Integrated in the Smart Grid", in *Proceedings of International Workshop on Risk and Trust in Extended Enterprises (RTEE'2010)*, November, 2010 and is also reusing the core concepts of the trust vector model from Indrajit Ray, Sudip Chakraborty and Indrakshi Ray, "VTrust: A Trust Management System Based on a Vector Model of Trust," Proc. of the 1st International Conference on Information Systems Security, December, 2005 and Indrakshi Ray, Indrajit Ray and Sudip Chakraborty, "An Interoperable Context-Sensitive Model of Trust", Journal of Intelligent Information Systems, vol 32(1) 2009 and extending the model with reputation evaluation procedures and behaviour analysis for trust monitoring and reputation building in the wireless mesh.

The Indian patent application IN2142/CHE/2008, describes a reputation based scheme in a wireless Ad-hoc network. The reputation scheme is based on passive mechanisms only to detect misbehaviour, such as by detecting packet discard. IN2142/CHE/2008 differs from the present invention mainly because it addresses Ad-hoc networking and that it only uses passive techniques to detect misbehaviour.

US2011078775 discloses a method where a combined trust value is computed based on local (i.e. node) credibility and a historical trust value stored in a trust server. US2011078775 does not combine the parameters in the same way as the present invention.

US2013315077 and US2013094398 show methods where an overall reputation is determined by a combination of multiple measured quantities, e.g. packet drops, delay, error rate etc. These documents do not combine the same parameters as the present invention.

In US2009328148, trust is evaluated for a group/cluster of nodes. The trust model works in three phases; at node level, at cluster-head level and at base-station level. US2009328148 does not combine the same parameters as the present invention.

SUMMARY

It is an object of the present invention to provide an improved alternative to the above techniques and prior art. More specifically, it is an object of the present invention to detect the status of a mesh node in a wireless mesh network.

To achieve these and other objects, a method, a gateway and a computer program product are provided.

The invention is based on the insight that by collecting information about a node/router/gateway over time, and also collecting this information (anomaly metrics) from the node/router/gateway's neighbours it is possible to obtain a more complete view of the situation and make a decision.

It is necessary to establish trust between mesh nodes to be able to detect misbehaving mesh nodes and prevent network attacks. The invention proposes the use of a vector, where a gateway (GW) builds the vector with data from nodes over time. The vector is based on:

Reputation—based on recommendations from other nodes or other GWs,

Experience—GWs direct experience with the node, and

Knowledge—what the GW knows about the node (e.g. credentials, source IP, router type etc.).

Action is taken by the GW if the combined Reputation, Experience and Knowledge is below a certain level. Actions could be e.g. choose alternative path, remove node from mesh etc.

According to a first aspect of the invention, a method for detecting the status of a mesh node in a wireless mesh network is provided.

According to a second aspect of the invention, a gateway for detecting the status of a mesh node in a wireless mesh network is provided.

According to a third aspect of the invention, a computer program product for detecting the status of a mesh node in a wireless mesh network is provided.

The availability threats to routers in the wireless mesh are addressed indirectly by means of trust monitoring and reputation building to establish guards against such threats and making it possible to detect the status of a mesh node and thereby determine the existence of a misbehaving node in a network of well-behaving nodes. What is new with the present invention is that it combines methods of active probing to detect misbehaviour, passive methods of detection, and a range of binary tests based on anomaly metrics to build up a level of trust over time.

In accordance with an embodiment of the invention, a gateway is building up a vector over time by combining active detection of the status of a mesh node, by accumulating responses to transmitted queries, passive detection of the status of a mesh node, by monitoring and collecting routing metric values and storing the values in a table and binary tests on anomaly metrics. The status of the mesh node is regarded as misbehaving when the vector reaches a certain level and the gateway can then take appropriate action.

One advantage with the concept of the present invention is to more accurately, with a lower rate of false positives than if only one detection method is used, detect a compromised node/router/gateway in the wireless mesh network.

Another advantage and benefit is that the reliability of the communications is improved.

BRIEF DESCRIPTION OF THE DRAWINGS

Further features and advantages of the present invention will emerge more clearly to a person skilled in the art from the following non-limited detailed description when considered in connection with the attached drawings, wherein.

DETAILED DESCRIPTION

Figure 1:
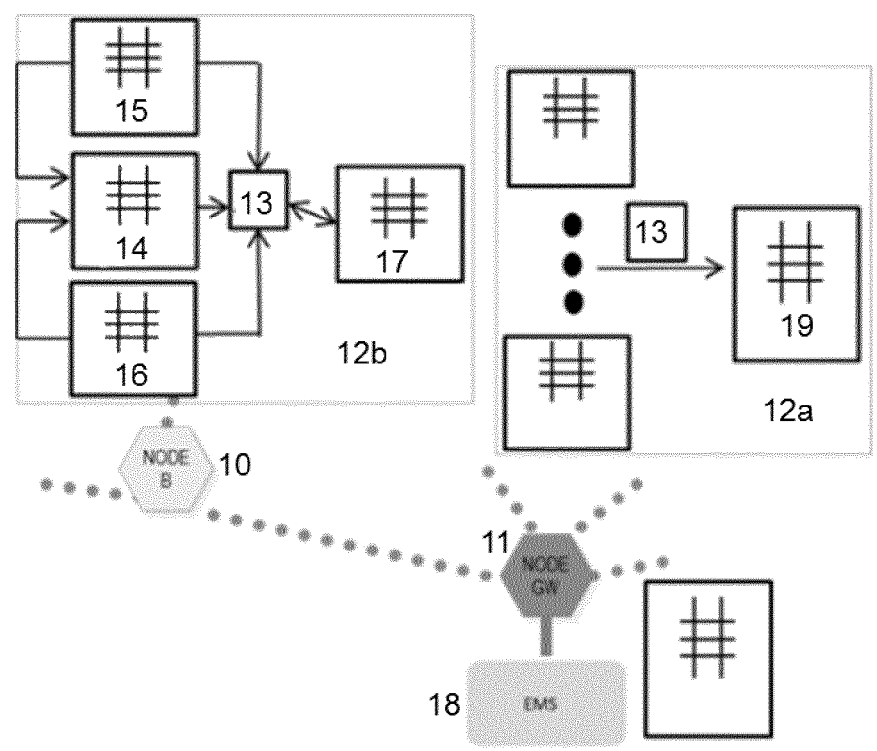
FIG. 1 shows an overview of the strategy for how the repositories are maintained in accordance with an exemplifying embodiment of the present invention.

The invention and the advantages thereof will now be described by way of non-limiting examples, with reference to the accompanying drawings of which:

The trust vector model defines trust and distrust in the following way:

Definition 1. Trust is defined to be the firm belief in the competence of an entity to act dependably and securely within a specific context.

Definition 2. Distrust is defined as the firm belief in the incompetence of an entity to act dependably and securely within a specified context.

Trust is specified in the form of a trust relationship between two entities—the truster—an entity that trusts the target entity—and the trustee—the target entity that is trusted. This trust is always related to a particular context. An entity A does not need to trust another entity B completely. A only needs to calculate the trust associated with B in some context pertinent to a situation. The specific context will depend on the nature of relevant applications or systems and can be defined accordingly. In the trust vector model a trust relationship $$(A \xrightarrow{c} B)t$$

is a vector with three components—experience, knowledge, and recommendation. It is represented by $$(A \xrightarrow{c} B)t = [AEcB, AKcB, \psi RcB],$$

where $AEcB$ denotes the magnitude of A's experience about B in context c, $AKcB$ denotes A's knowledge and $\psi RcB$ denotes the cumulative effect of all B's recommendations to A from different sources.

Experience is defined as the measure of accumulated effect of a number of events that were encountered by the truster with respect to the trustee in a particular context. Experience of a truster with a trustee depends on events encountered by the truster that happen over time. Recommendation is defined as the measure of the objective judgement of a recommender about the trustee to the truster. The truster A obtains recommendations from multiple recommenders regarding trustee B in context C. Knowledge is defined as measure of the objective judgement of a recommender about the trustee to the truster. Examples are credentials, source IP address and type of router (e.g., a mobile router).

To compute a trust relationship the model assumes that each of these three factors is expressed in terms of a numeric value in the range $[-1,1] \cup \{\perp\}$. A negative value for the component is used to indicate the trust-negative type for the component, whereas a positive value for the component is used to indicate the trust-positive type of the component. A zero value for the component indicates that it is trust-neutral. To indicate a lack of value due to insufficient information for any component the trust vector model uses the symbol $\perp$.

Experience and recommendation values may be derived in the following way:

1) Recommendation

The recommendation parameter is evaluated based on behavioural information from the routers in the Tropos Network. The number of recommendations requested from A depends on whether A already has an established trust relationship with B and the information already available on B from the nearby components. Based on the existing trust relationship information and the recommendations given, A builds a recommendation graph, reflecting the current knowledge about Bs trustworthiness. This graph shows the components that provided information and the relationships between these components. A uses this information to derive the recommendation score for B, but may also use the graph to improve future trust evaluation of the specific router B and other routers.

2) Experience

Behaviour analysis is a common tool used within the security domain. Intrusion Detection Systems (IDS) and Honeypots are examples of mechanisms using behaviour analysis. However, these two mechanisms have a well-known problem of false-positives, meaning a tendency to generate too many alarms, and making it hard to separate intended from malicious activity. In our invention, we simplify the analysis by measuring B's behaviour in terms of A's experience with B. Experience is expressed as the cumulative effect of events that happened between A and B. The truster keeps the event log regarding B in the experience repository. Each event is classified as either positive or negative. The combined result of these events evaluates the experience component.

3) Knowledge

Knowledge is defined as measure of the objective judgement (belief) of a recommender about the trustee to the truster regarding information that the truster has about the trustee that it knows to be true. Examples are credentials, source IP address, MeshID, type of router (e.g., is the router a mobile router). Further examples of knowledge could include known vulnerabilities to protocols, or known types of attacks/attack patterns. Knowledge can be measured by adding the number of positive beliefs the truster has about the trustee along with the number of neutral beliefs the truster has about the trustee divided by the total number of positive, neutral and negative beliefs the truster has about the trustee.

An embodiment for detecting the status of a mesh node in a wireless mesh network of one or a plurality of mesh nodes is shown in FIG. 1. Support filters are placed on relevant interfaces to mesh nodes in the Tropos network. Each of these filters monitors the behaviour of the neighbour nodes and evaluates the trustworthiness of a neighbour node based on these behavioural observations. These behavioural observations may be passively collected observations, or observations collected as a result of one mesh node actively probing another mesh node by making a request and seeing if the neighbour responds correctly. Suppose a node B 10 is in a cluster with gateway (GW) A 11. We have A→B, where the GW (A) 11 is the truster and the node (B) 10 is the trustee. The trust relationship that A 11 has established on B 10 depends on two parameters—(i) recommendation about B 10 from other access nodes and (ii) A's 11 past experience with B 10. Each of these parameters are expressed using a numeric value in the range [0, 1], similarly to what is done in the trust vector model. As in the trust vector model, the truster A assigns relative importance to the parameters and combines them to evaluate the trust value of the trustee. The resulting trust value is a single numeric value within the range [0, 1]. To build reputation and to store behavioural information, the filters are augmented with repositories/tables. This is specific for the invention and represents the extension of the trust vector model into a distributed reputation building scheme. Every node and gateway (GW) in the network possesses a reputation manager 12a, 12b which is a software entity containing data repositories and policies 13. Policies 13 are mathematical logics or functions. The repositories at node B 10 (and every node in the network) are: a recommendation repository 14, an experience repository 15, a knowledge repository 16 and a trust repository 17. The recommendation repository 14 stores the recommendations obtained from other access nodes/GWs in the Tropos mesh network acting as recommenders. The experience repository 15 records truster A's 11 past experience with B 10. The trust repository 17 stores the trust value that A 11 has about other routers/nodes. Recommendations are computed based on experience and knowledge and the trust repository 17 stores trust records about the mesh nodes. These trust records are computed as the outcome of decisions made based on a policy with inputs from the experience 15, recommendation 14 and knowledge 16 repositories. The reputation manager 12a in the GW 11 works on gathered trust values coming from each of the nodes in a cluster. Based on a policy, every GW computes reputations of all nodes in a cluster and stores them in their reputation repository 19. For each node in the mesh whose reputation falls below a threshold, the GW 11 sends a list of misbehaving nodes to the Tropos Energy Storage Model (ESM) 18. The ESM 18 maintains lists from all GWs in its reputation monitor. Temporary memory or cache at every node maintains the experience and recommendation repositories. When recommendations are computed from a set of experience values, these values shall be erased from the memory. Old recommendation values shall also be erased when trust values are generated (and sent to the GW).

However a knowledge value will not be deleted because of its permanent nature. If resources are limited at the GW, it can also adopt a similar strategy to free up its memory. FIG. 1 presents an overview of the strategy for how the repositories are maintained in the present invention. The recommendation repository 14 of a node contains the recommendations that a mesh node has computed about its neighbours. The knowledge repository 16 of a node contains the knowledge that the mesh node has about its neighbours and the experience repository 15 contains experience that the node has with its neighbours, i.e. storing of events encountered. Experience and recommendation values are derived based on anomaly metrics that provide extensions of the wireless mesh routing metrics.

Active means of detection of the status of a mesh node includes reputation building where a mesh node is actively sending a query to a neighbor (i.e. probing the neighbor) according to the communication protocol and checking whether the response received is the expected response. If the response is as expected, a positive value is stored in the experience table. If the response is not as expected, a negative value is stored in the experience table.

The GW is able to discover misbehaving nodes in the wireless mesh cluster based on processing the vectors collected and stored in the reputation repository 19.

Non-exhaustive examples of anomaly metrics that can be used in the invention:

Router flooding—when the router sends more traffic than others. It is identified based on packet success rate.

Anomaly metric based on radio interface information metrics of Tropos. This may be used to detect physical tampering with the router/antenna.

Packet discard—malicious packet loss by the router. It is identified based on packet success rate or link quality.

802.11 Management frame flooding. Flooding routers with 802.11 management frames. This metric is used to detect whether a fellow router is flooding the network. This can exhaust other routers' resources.

CPU Utilization/Additional processing in router. This metric is used to discover if the router is running extra code. This may be identified by probing the suspected router. If processor utilization is over a threshold during a specified observation time, then the trigger is sent to the GW in the reverse beacon. Alternatively, a node can periodically query the upstream node about this metric and pass the result back to the gateway along with the other values in the vector according to policy.

There are several metrics and mechanisms existing in Tropos routing that can be reused in the present invention. For the routing protocol, these metrics are used to optimize routing paths, maximize throughput and ensure reliable communications in the mesh. With the reputation building scheme of the invention the information collected in Tropos metrics can also be used to build information over time about unwanted situations and behaviors also. The routing metrics that can be used in the reputation scheme are:

Path packet success rate, both forward and reverse directions. This metric can be used to help identify a possible infected node as part of the reputation building scheme for the router. If evaluated alone, this metric could lead to too many false positives, however, in combination with other experiences, knowledge and recommendations provides interesting information about the node.

Path hop count. This metric may be useful in identifying routers exhibiting behavior associated with a sink hole attack Link packet success rates (broadcast) for the links comprising each candidate path as well as the current default path. This metric can be used in identifying routers that send more traffic or less traffic than what should be expected.

Link modulation rates for the links comprising each candidate path and current default path.

Cluster size for the cluster containing each candidate path and current default path. This information can be used in weighting of recommendations.

Persistence of the current default path and each candidate path. This may provide additional information that may be weighed in along with link packet success rate recommendations (e.g. for identifying a router sending wrong link packet success rate)

Radio interface information on the radio used in the current default path and the candidate path. This information can be used in the calculations to determine whether a router has been manipulated on the radio interface or if a router is experiencing interference from an external hostile source in the environment.

noise level on the radio interface

Radio interface type neighbor counts: number of neighbors on the radio interface received signal strengths from neighbor nodes on the radio interface probe response success rate from neighbor nodes on the radio interface backhaul link throughput: communication speed of the gateway's backhaul link (e.g., 100 Mbps Ethernet)

Passive means of detection (such as passive observation of packet success rate) includes that each mesh node monitors the behavior of its upstream neighbors with respect to the experience metric link quality. Each node collects the link quality in its experience table. Based on the routing tree, over an extended period of time, it is possible for each mesh node to store experiences periodically in the table about its neighbors. The time at which the link quality is measured, e.g. a time stamp to register the time that the link quality measurement was taken, is stored along with the link quality, and a neighbor identifier. In this way, link quality values (events) are stored over time in the experience table.

The Tropos routing protocol considers the following link quality factors: packet success ratio (or link success rate), traffic congestion, latency and persistence of the beacon. Upstream nodes are the nodes which lead to the gateway. According to the Tropos routing algorithm, every node in the network knows its upstream nodes. Each node maintains its own experience table where experience values are stored for each of its neighbors based on the metrics. An experience value is assigned based on node C's experience with its upstream neighbors.

In one example, the beacon packet success rate is equal to Y/X where X is the number of beacons transmitted by the GW and Y is the actual number of beacons received by a specific node whose experience value is being computed.

In one example, if Y is less than X then the beacon packet success rate shall be less than 100% and we term this experience incidence as packet discard at time t by the upstream neighbor nodes.

In one example, if Y is higher than X then the beacon packet success rate shall be higher than 100% and we term this experience incidence as packet flooding by the upstream neighbor nodes.

Figure 2:
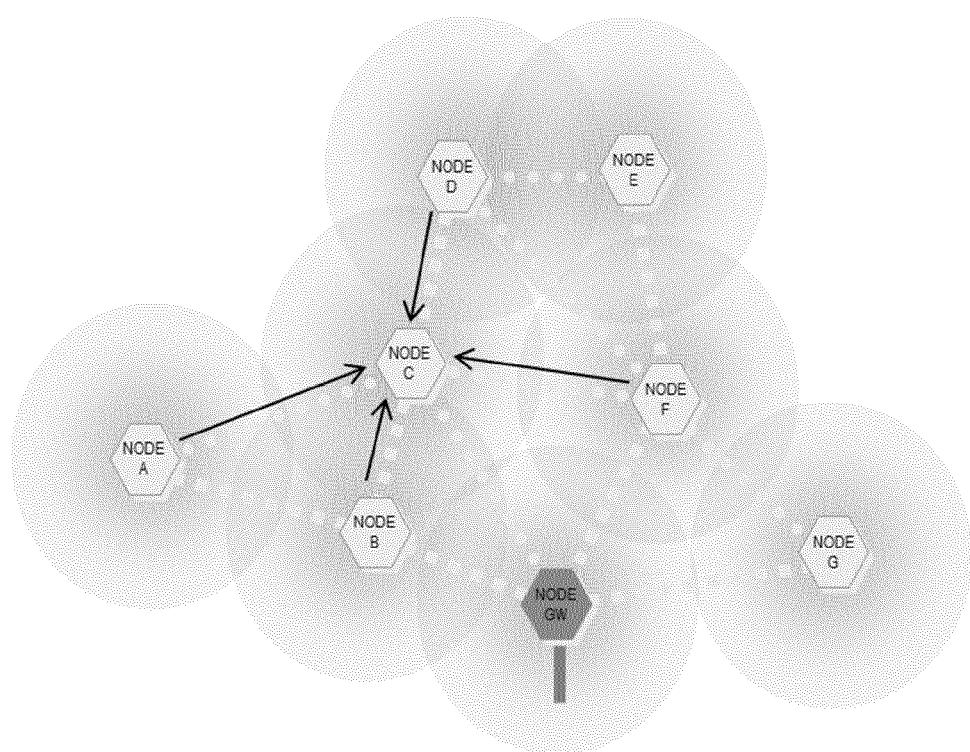
FIG. 2 shows a drawing illustrating received beacons by a node in accordance with an example of the present invention.
Figure 3:
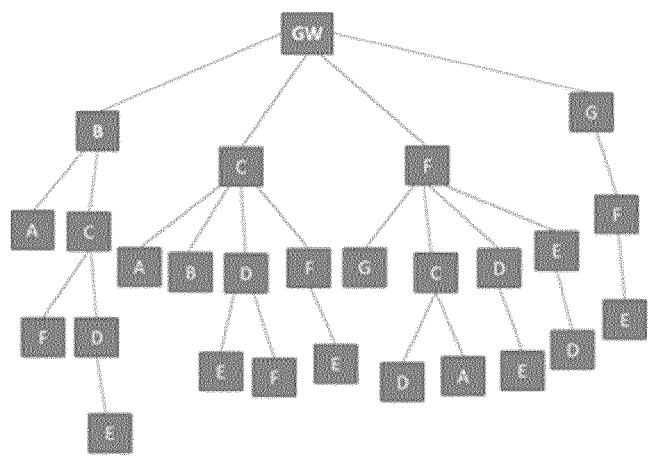
FIG. 3 shows a drawing illustrating a routing tree in accordance with an example of the present invention.

Further detailing these examples, a node of a cluster records the experience value of its upstream neighbor nodes by computing the success rate of beacons received from the upstream neighbor nodes. As every beacon has a sequence number, the receiving node can compute the beacon success rate using the ratio of the number of beacons it actually received and the number of beacons it should have been receiving (beacon packet success rate is equal to Y/X where X is the number of beacons transmitted by the GW and Y is the actual number of beacons received by a specific node whose experience value is being computed). For example in FIG. 2 node C received beacons from Node A, B, F, and D. However, node F and B are the only upstream nodes of node C (FIG. 3). Node C then records the experience values of node B and F by computing the success rate of beacons received from node B and F. The experience value of B at C would be the beacons success rate which is equal to Y/X where Y is the actual number of beacons received by C.

The computations of beacon packet success rates are periodic events. Whenever a node receives multiple of X number of beacons, it computes the beacon success rate from its upstream nodes. After a certain time, the Tropos routing algorithm may decide E-D-C-F-GW as the preferred path to reach E instead of E-D-C-B-GW. Node C then computes the experience value of F as F is now its upstream node. While the routing algorithm leads to changes in preferred paths over time, the router will continue to log experiences for each neighbor over an extended period of time and keeps track of the history of experience events for each of its neighbors.

Figure 4:
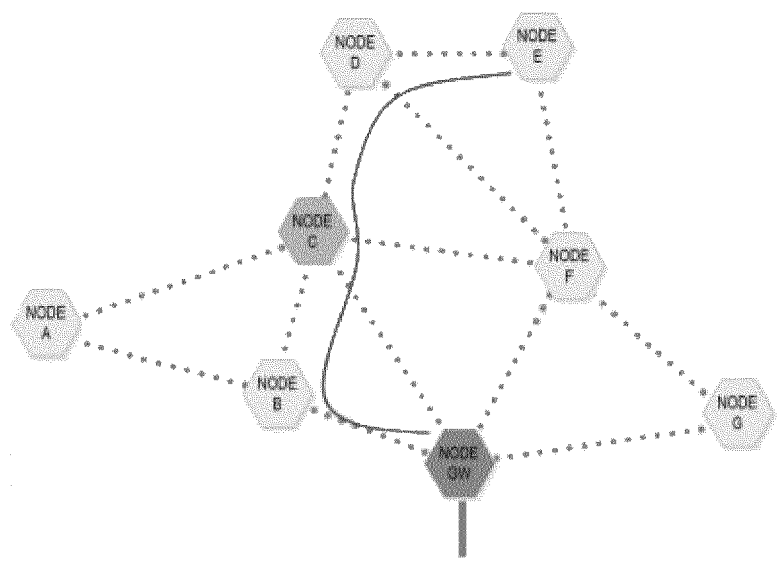
FIG. 4 shows a drawing illustrating a topology of a wireless mesh network in accordance with an example of the present invention.

The packet discard incidence can be measured using the beacon packet success rate according to the example described above. For the explanation, we use the mesh network topology illustrated in FIG. 4. We assume that during a period of time according to the Tropos Routing Protocol (FIG. 3), during a period of time with a routing tree illustrating the routing paths that have been chosen as optimal routes, or best alternative routes in the mesh for the nodes in the cluster.

Each node collects the experience of link quality in its experience table. Based on the routing tree, over an extended period of time, it is possible for each node to store experiences about its neighbors. As we, in this example, are confining the experience to the link success rate, we therefore make experience tables for each node, storing experiences of the node with each of its upstream nodes. As can be seen from the routing tree during this period of time give in FIG. 5, B only has C as possible upstream node and therefore only stores experience values about C as upstream node. As B is a neighbor to the GW with only one possible upstream node C on paths that go from the GW to C and then to B only, the table of B given in Table 1 contains only an entry for C as this is the only possible upstream node to B. The experience values collected during the time period and stored in the experience table during times $t_1$, $t_2$, $t_3$ and $t_4$, are averaged, to obtain the value given in the column on the far right in Table 1, and this averaged value is denoted by R. In this example, R is used as the recommendation value that B's reputation manager will use for the computation of its trust about its upstream nodes, according to the policy of this overly simplified example to demonstrate the framework.

TABLE 1

Node B's Experience table with upstream nodes.

| Experience of B | t1 | t2 | t3 | t4 | R |
|---|---|---|---|---|---|
| C | 0.6 | 0.5 | 0.7 | 0.6 | 0.6 |

Table 2 illustrates the experience values that node F has stored about each of the possible upstream nodes G, C and D. Similarly, this is done in Table 3 and Table 4 for several other nodes and this way one can find the experience values of other nodes of FIG. 4 as well.

TABLE 2

Experience table for Node F.

| Experience of F | t1 | t2 | t3 | t4 | R |
|---|---|---|---|---|---|
| G | 0.70 | 0.8 | 0.8 | 0.7 | 0.75 |
| C | 0.5 | 0.6 | 0.7 | 0.6 | 0.6 |
| D | 0.7 | 0.7 | 0.7 | 0.75 | 0.71 |

TABLE 3

Experience tables for nodes G.

| Experience of F | t1 | t2 | t3 | t4 | R |
|---|---|---|---|---|---|
| F | 0.9 | 0.8 | 0.9 | 0.8 | 0.85 |

TABLE 4

Experience tables for nodes E.

| Experience of F | t1 | t2 | t3 | t4 | R |
|---|---|---|---|---|---|
| D | 0.8 | 0.9 | 0.9 | 0.8 | 0.85 |
| F | 0.7 | 0.7 | 0.8 | 0.75 | 0.74 |

In one example, each node can send only these recommendation values to GW node. And based on all the recommendation values received from the nodes, the GW can compute the aggregated recommendation value for each node, as shown in Table 5. Based on the values given in the table, the recommendation value for node C is below for example the threshold of 0.6 indicating that C is behaving abnormally compared to the other nodes in the cluster during this time period. The threshold value is a pre-defined value. Node C will appear in GW's reputation table as a suspected malicious node.

TABLE 5

The initial recommendation table for the GW.

| | B | C | D | E | F |
|---|---|---|---|---|---|
| R | 0.8 | 0.545 | 0.78 | 0.8 | 0.78 |

In another example, we may enhance the scheme to include weighting of trust based on how many times the recommending node appears in the routing tree as a downstream node to the node it is providing a recommendation about (as this could indicate that a node that appears in several paths will have more experiences than a node that only appears on one path) and therefore should be weighted more strongly in the reputation evaluation.

In one example, the reputation is required to send the vector, $[_AE^C_B, _AK^C_B, _\psi R^C_B]$, at regular intervals to the gateway. In another example, the reputation manager in the node computes trust values based on policies and sends the trust values at regular intervals to the GW. In one example, experience values are used to compute the recommendation value based on a pre-defined policy (mathematical logics, and or functions). A policy may involve periodical computations (mathematical logics) on experience values stored during a pre-defined period of time in the experience repository resulting in a recommendation value for that period of time. In the example shown above, the recommendation value has been derived simply by averaging the experience values collected over time. The recommendation value together with the knowledge values can be used to derive the trust value for each of the neighbors which is forwarded to the GW at specific intervals based on a pre-defined policy.

In another example, knowledge about the neighbor can be used in the recommendation computation. The recommendation values together with the experience value can derive the trust value for each of the neighbors based on pre-defined policies.

In one example, every mesh node passes the trust values of its neighbors in reverse beacons up to the GW of the cluster periodically.

In one example, the GW has a reputation manager and a reputation table based on the trust repository. The reputation table is updated based on the trust values received from each of the nodes in the cluster. The trust values are aggregated in the reputation table by the reputation manager. The GW might also have a trust weighting policy to account for previous experience with an entity in the mesh or to account for entities of which GW has no prior relations with. A trust weighting policy can be useful as it would allow the GW to adjust/correct a trust values provided by a node depending on how well GW trusts the node making the recommendation about another node.

In one example, if a reputation value falls below a threshold for a node, Tropos control is notified and the node may be isolated.

The Tropos Mesh and the Tropos routing protocol is highly dynamic; if a link goes down then the topology of the mesh may change. This means that the routing tree is expected to change over time and the best path and best alternative paths will also change dynamically depending on conditions that are evaluated by Tropos routing metrics. The recommendation graph and recommendation table will also need to be updated periodically and will be able to provide a history over time that can provide indications of misbehaving nodes.

IEEE 802.11i has unprotected management frames such as authentication and de-authentication frames, association and de-association frames, EAPOL-start frames etc. In one example, mesh node measures the number of management frames it receives from other nodes. If the rate of received management frames is higher than a pre-defined threshold, the receiver node can identify the sender node/nodes as suspected malicious nodes. In one example, if a sender node repeatedly sends authentication or association frames within a short period of time, the receiver node can identify this node as a malicious node. In one example, de-authentication or de-association frame immediately followed by authentication or association can be considered as malicious behavior.

In one example, the mesh nodes are passing the vectors periodically in the reverse beacons to the gateway.

In one example, the GW node explicit sends probe request to the misbehaving nodes to extract more information which will help establishing their misbehaviors. The GW singles-out (or randomly choses) several nodes which are behaving according to the behavioral pattern associated with an attack.

Figure 5:
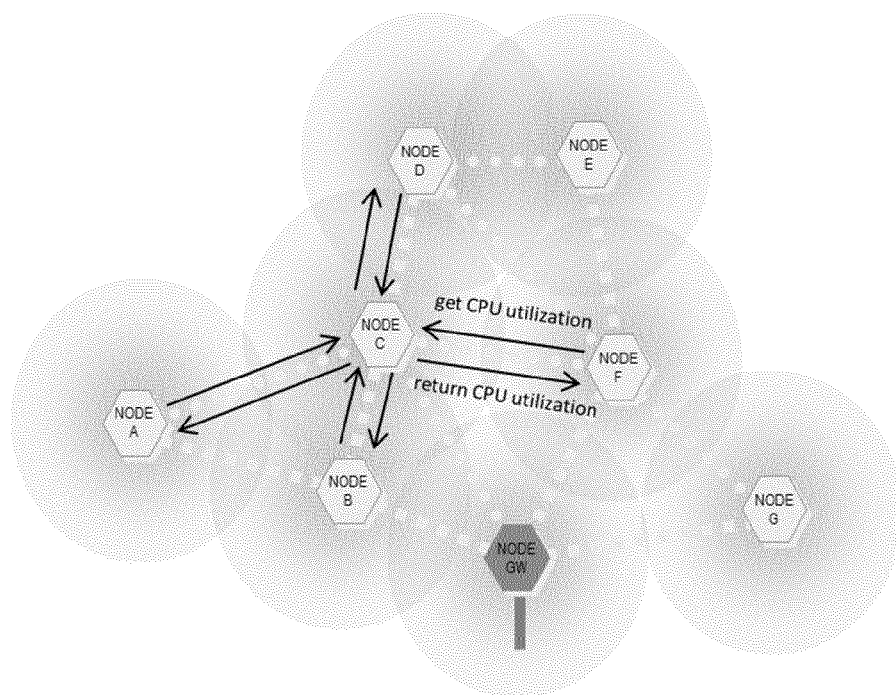
FIG. 5 shows a drawing in accordance with an example of the present invention.

An example of such behavior is sending more traffic than it is supposed to send (e.g. as identified by the anomaly metric for this and observed by the reputations manager). Sending more traffic than expected could be the pattern of a denial-of-service attack. The GW can use the reputation table to pick the suspected/misbehaving nodes. The GW then explicitly asks the neighbor nodes to send probe requests to the selected set of misbehaving nodes. Sending probe request from all the neighbors to a specific can result resource exhaustion of the receiving node. In order to avoid this, in this example, the GW node only asks upstream neighbor nodes to send probe requests. The neighbor nodes then send probe requests to these nodes. If the node is sending more traffic its CPU utilization will be unusually high (possibly higher than a threshold). FIG. 5 shows an instance where C has been singled-out as the node sending more traffic and the GW sends a request to each node A, B, D, and F (at randomly spaced time intervals so that the requests are not all sent at once) with the request to start monitoring node C by sending probe requests at random intervals to obtain the CPU utilization of node C. Node C then returns its CPU utilization value on request to each of these nodes periodically.

In one example, the response time for sending the return value of a probe request will further identify whether node C sends wrong information. If node C takes longer time to response, it may mean it is already overloaded even though it reported a lower CPU utilization.

In one example, the GW node selects a set of pairs of nodes (truster_i, trustee_i) and requests that the truster nodes send probes periodically to the trustee nodes over a period of time. The GW singles-out (or randomly chosen) the pairs of nodes. The GW then explicitly asks the truster nodes to send probe requests to the respective truster nodes and monitor the responses over a period of time, storing the responses to the probes in the experience repositories (for each truster node). Each truster node then sends probe requests to the designated trustee node periodically over the required time period. If a trustee node is sending more traffic during the course of the observation period, its CPU utilization will be unusually high (possibly higher than a threshold). This information is communicated to the GW, e.g. in the vectors sent to the GW. FIG. 5 shows an instance of sets of (truster_i, trustee_i) nodes that are part of this scheme for monitoring the processor utilization. Truster nodes will send the result back to the gateway at the end of a given interval.

One advantage with the present invention is that it provides flexibility and allows combinations of a variety of techniques for detection of intrusions/anomalies which alone only provides some information (that may not be sufficient to identify a misbehaving node) but together can provide a more complete picture of an anomalous node.

Another advantage is that it enables to more accurately (with a lower the rate of false positives than if only one detection method is used) detect a compromised node/router/gateway in the wireless mesh network.

The person skilled in the art realises that the present invention is not in any way restricted to the examples described above. On the contrary, several modifications and variations are possible within the scope of the invention as defined in the appended claims.

The invention claimed is:

1. A method for detecting the status of a mesh node in a wireless mesh network of one or a plurality of mesh nodes, wherein a gateway is building up a trust vector over time by combining:

active detection of the status of a mesh node by accumulating responses to transmitted queries, wherein the active detection comprises:
   sending a query to a mesh node neighbour according to a communications protocol, and
   checking whether the response received is the expected response, wherein if the response received is the expected response, storing a positive value in a table, and if the response received is not the response expected, storing a negative value in a table, passive detection of the status of a mesh node by monitoring and collecting routing metric values and storing the values in a table, wherein the passive detection comprises:
   monitoring the behavior of their upstream neighbours, with respect to link quality,
   collecting the link quality values in a table,
   storing the link quality values about its neighbours periodically in the table, based on a routing tree, and
   storing the time at which the link quality is measured along with the link quality and a neighbor identifier, thereby enable link quality values to be stored over time, wherein a reputation manager at each mesh node sends the trust vector [AEcB, AKcB, ψpRcB] at regular intervals to the gateway, wherein the trust vector comprises (1) an experience valuation based on the gateway's direct experience with the mesh node, (2) a knowledge valuation based on what the gateway knows about the mesh node, and (3) a recommendation valuation based on collected recommendations from other mesh nodes or other gateways, wherein the status of the mesh node is regarded as misbehaving when the trust vector reaches a certain level.

2. The method according to claim 1, wherein the passive detection of the status of a mesh node includes monitoring of a beacon passive success rate, wherein the beacon passive success rate is equal to Y/X, wherein X is the number of beacons transmitted by a gateway and Y is the number of beacons received by a specific node whose value is being computed and wherein:
   if Y is less than X and the beacon passive success rate is less than 100%, the experience incidence is termed as packet discard by the upstream neighbour nodes.

3. The method according to claim 2, wherein the reputation manager includes that each mesh node sends its collected link quality values from its upstream neighbours stored in a table to a gateway, and wherein the gateway, based on the received link quality values, determines an aggregated value.

4. The method according to claim 3, wherein the reputation manager further includes weighting based on how many times the mesh node that sends its collected link quality values appears in the routing tree as a downstream node to the mesh node it collects link quality values from.

5. The method according to claim 4, wherein determining trust values includes that the reputation manager in each mesh node computes the experience valuation, knowledge valuation and recommendation valuation based on policies and sends the trust values at regular intervals to the gateway, wherein the policies includes mathematical logics and/or functions.

6. The method according to claim 3, wherein monitored and collected routing metric values that each node has stored in its table are used to compute the link quality values based on a pre-defined policy, wherein the policy includes mathematical logics or functions.

7. The method according to claim 1, wherein action is taken when the trust vector reaches a certain level.

* * * * *